(12) United States Patent
Tewes

(10) Patent No.: US 10,986,328 B2
(45) Date of Patent: Apr. 20, 2021

(54) DEVICE, METHOD AND SYSTEM FOR GENERATING DYNAMIC PROJECTION PATTERNS IN A CAMERA

(71) Applicant: DENTSPLY SIRONA Inc., York, PA (US)

(72) Inventor: Michael Tewes, Bruhl (DE)

(73) Assignee: DENTSPLY SIRONA INC., York, PA (US)

( * ) Notice: Subject to any disclaimer, the term of this patent is extended or adjusted under 35 U.S.C. 154(b) by 0 days.

(21) Appl. No.: 16/003,592

(22) Filed: Jun. 8, 2018

(65) Prior Publication Data

US 2019/0379881 A1    Dec. 12, 2019

(51) Int. Cl.
| | | |
|---|---|---|
| H04N 13/254 | (2018.01) | |
| G06T 7/521 | (2017.01) | |
| G02B 3/00 | (2006.01) | |
| G02B 5/20 | (2006.01) | |
| G02B 19/00 | (2006.01) | |
| G02B 27/30 | (2006.01) | |

(52) U.S. Cl.
CPC .......... *H04N 13/254* (2018.05); *G02B 3/0056* (2013.01); *G02B 5/201* (2013.01); *G02B 19/0014* (2013.01); *G02B 19/0066* (2013.01); *G06T 7/521* (2017.01); *G02B 27/30* (2013.01); *G06T 2207/10012* (2013.01)

(58) Field of Classification Search
CPC ............ G01B 11/2518; G01B 11/2527; G01B 11/2536; G01B 11/005; G01B 11/25; G01B 11/2513; G01S 7/4815; G01S 7/4818; G01S 7/486; G01S 7/499; G01S 17/48; G01S 17/89; G01S 7/484; G01C 3/08; A61C 19/04; A61C 9/0053; A61B 1/24; A61B 1/00193; A61B 1/0646; A61B 1/00009

See application file for complete search history.

(56) References Cited

U.S. PATENT DOCUMENTS

| | | | |
|---|---|---|---|
| 5,963,667 A | * | 10/1999 | Hashimoto ............. G06K 9/74 382/190 |
| 7,522,764 B2 | | 4/2009 | Schwotzer |
| 7,852,492 B2 | | 12/2010 | Berner |
| 8,160,334 B2 | | 4/2012 | Thiel |
| 8,280,152 B2 | | 10/2012 | Thiel |
| 8,957,954 B2 | | 2/2015 | Thiel |
| 9,494,418 B2 | | 11/2016 | Schmidt |
| 9,910,255 B2 | | 3/2018 | Berner |
| 2004/0119984 A1 | * | 6/2004 | Andreev ............ G01B 11/0616 356/495 |

(Continued)

FOREIGN PATENT DOCUMENTS

DE    102013218231 A1    3/2015
EP    2051042 B1    11/2010

*Primary Examiner* — Neil R Mikeska

(74) *Attorney, Agent, or Firm* — Dentsply Sirona Inc.

(57) ABSTRACT

A device, method and system for utilizing an optical array generator to generate dynamic patterns in a dental camera for projection onto the surface of an object, while reducing noise and increasing data density for three-dimensional (3D) measurement. Projected light patterns are used to generate optical features on the surface of the object to be measured and optical 3D measuring methods which operate according to triangulation principles are used to measure the object.

22 Claims, 10 Drawing Sheets

(56) References Cited

U.S. PATENT DOCUMENTS

| | | | | |
|---|---|---|---|---|
| 2010/0008588 A1* | 1/2010 | Feldkhun | ............ | G01B 11/2518 |
| | | | | 382/206 |
| 2010/0026963 A1 | 2/2010 | Faulstich | | |
| 2010/0059767 A1* | 3/2010 | Kawasaki | ......... | G02F 1/133615 |
| | | | | 257/89 |
| 2011/0242281 A1* | 10/2011 | Schmidt | ................. | A61C 19/04 |
| | | | | 348/46 |
| 2015/0009357 A1* | 1/2015 | Seibel | ................ | G02B 23/2469 |
| | | | | 348/222.1 |
| 2015/0281671 A1* | 10/2015 | Bloom | ............... | G01B 11/2527 |
| | | | | 348/46 |
| 2015/0355470 A1* | 12/2015 | Herschbach | .............. | F21V 5/08 |
| | | | | 362/11 |
| 2018/0299262 A1 | 10/2018 | Thiel | | |

\* cited by examiner

DEVICE, METHOD AND SYSTEM FOR GENERATING DYNAMIC PROJECTION PATTERNS IN A CAMERA

BACKGROUND

Field

The present application relates generally to a device for generating dynamic projection patterns in a camera, and, more particularly, to a device, method and system for utilizing an optical array generator to generate dynamic patterns in a camera for projection onto the surface of an object for three-dimensional (3D) measurement.

Description of Related Art

In structured light scanning methods such as fringe projection, objects may be illuminated with structured patterns of light such as sinusoidal fringe patterns. The structured patterns may be geometrically distorted or phase modulated by the objects and then recorded as images with a camera at a known angle with respect to the projections. Techniques such as Fourier transforms may be used to calculate the distortions, displacements or phase modulations by analyzing the recorded images. For example, using a suitable phase unwrapping algorithm, pattern recognition or edge detection method, depth cues in recorded images may be converted into 3D coordinates for reconstruction. For example a continuous phase distribution which is proportional to the object height variations may be obtained and the system may be calibrated to map the unwrapped phase distribution to real world 3D coordinates.

Specifically 3D information may be obtained by taking an image of the object in an observation angle that is tilted at an angle to the direction of projection of the projected pattern. The projected pattern will then be distorted according to the surface shape of the object. The features of the projected pattern may be matched to the corresponding features in the distorted image by means of image processing algorithms. A problem arises if the object being measured is translucent. Projected light penetrates into the translucent object and is diffused in its depth. Examples of such material include wax, skin or teeth. As a result, the contrast of the pattern on the object surface decreases significantly, since the diffuse, unstructured scattered light from the object's depth is superimposed on the desired light reflected by the surface of the object. A reduced contrast may result in the inability to detect the projected features since the noise may become greater than the signal amplitude. Similarly, in the case of projector-assisted stereography, no correlation between the projected and recorded images may be found. A possible improvement in this situation is to increase the amount of light on the sensor to reduce the sensor's shot noise relative to the signal. However, this is technically limited by the full-well capacities of the image sensor pixels. Furthermore, the "object noise" (disturbances caused by the object itself e.g. from a rough surface or a non-uniform coloring) cannot be reduced by increasing the amount of light.

SUMMARY

Existing limitations associated with the foregoing, as well as other limitations, may be overcome by a device, method and system for utilizing an optical array generator to generate dynamic patterns in a camera/scanner for projection onto the surface of an object, while reducing noise and increasing data density for three-dimensional (3D) measurement. Herein, projected light patterns may be used to generate optical features on the surface of the object to be measured and optical 3D measuring methods which operate according to triangulation principles may be used to measure the object. A light pattern may be projected onto an object imaged by the camera. If the surface of the object is planar without any 3D surface variation, the pattern shown in the corresponding reflected image may be the same (or similar) to that of the projected light pattern. However, if the surface of the object is non-planar, the projected structured-light pattern in the corresponding image may be distorted by the surface geometry. Information from the distortion of the projected structured-light pattern may be used to extract the 3D surface geometry of the object being measured. By using various structured illumination patterns, along with noise reduction and data density increasing setups/techniques, 3D surface profiles of objects may be measured.

In one aspect, the present invention provides a 3D camera, comprising: an optical array generator for generating a plurality of dynamic patterns for projection; a first imaging optics arranged within the camera to focus the plurality of dynamic patterns onto a surface of an object to be measured; an imaging sensor arranged within the camera to record a plurality of reflected images formed from reflection of the plurality of dynamic patterns by the surface of the object to be measured; and a second imaging optics arranged within the camera to image the plurality of reflected images onto the imaging sensor, wherein the optical array generator further comprises (i) a light source including a plurality of discrete regions wherein a luminous intensity of each of the plurality of discrete regions is controlled independently, (ii) a lens array comprising a plurality of lenses constructed to image light from the light source onto an image plane to form the plurality of dynamic patterns and, (iii) a collimator constructed to direct light of the light source onto the lens array and, wherein luminous intensities of the plurality of regions of the light source are electronically controlled to generate the plurality of dynamic patterns in a time varying manner.

In another aspect, the present invention may include one or more of the following features (i) a camera wherein each of the plurality of lenses is biconvex, (ii) a camera wherein the plurality of discrete regions of the light source are selected from the group consisting of LED dies, laser diodes and an end of a plurality of optical fibers that have other light sources attached to the other end, (iii) a camera further comprising multiple collimators and multiple light sources, (iv) a camera further comprising a digital signal processing unit for processing the recorded images, (v) a camera wherein the imaging sensor is constructed to perform in-pixel demodulation, (vi) a camera wherein the light source is a 2×2 LED array of LED dies, (vii) a camera wherein the wherein each of the plurality of lenses is spherical, (viii) a camera wherein the wherein each of the plurality of lenses is cylindrical, (ix) a camera wherein the thickness of the lens array is between 50 µm to 10 mm, (x) a camera wherein the lens array comprises a glass carrier, two polymer layers molded on opposite sides of the glass carrier and a structured mask applied to the glass carrier for selectively altering light of the light source, (xi) a camera wherein the mask is a structured color filter for impressing a binary or a color code on the light from the light source, (xii) a camera wherein the plurality of dynamic patterns are non-periodic, (xiii) a camera wherein the centers of the plurality of lenses of the lens array are individually offset, to produce the non-periodic dynamic patterns, (xiv) a camera wherein the plurality of dynamic patterns are periodic, (xv) a camera wherein the lens array comprises entrance and exit lens pairs, wherein the entrance lenses act as Fourier lenses and the exit lenses act as field lenses and wherein each pair creates a sub-image in the image plane, (xvi) a camera wherein the lens array comprises a first lens array having entrance lenses which act as Fourier lenses and a second lens array having exit lenses which act as field lenses and wherein the first and second micro-lens arrays have a single sided profile and are constructed to face each other, and (xvii) any combinations thereof.

In one aspect, the present invention provides a method for generating a plurality of dynamic patterns for measuring an object, the method comprising: electronically controlling the luminous intensities of each of a plurality of discrete regions of a light source to generate structured light for a collimator; directing the structured light from the light source onto a lens array using the collimator; producing sub-images of the structured light using a plurality of lenses of the lens array wherein the sub-images are formed in a focal plane of the lens array to form the plurality of dynamic patterns; focusing the plurality of dynamic patterns onto a surface of an object to be measured; imaging a plurality of reflected images onto the imaging sensor; recording the plurality of reflected images with the imaging sensor, and processing the plurality of recorded images to obtain a three-dimensional image of the object using a modulation signal of the light source.

In one aspect, the present invention provides a method including one or more of the following features: (i) a method further comprising reducing the average irradiance of the object by projecting and evaluating dynamic patterns in a temporal sequence to receive the same or substantially the same number of 3D data points in total as the number of 3D data points that would be received for projecting a full pattern, (ii) a method wherein the average irradiance of the object is reduced by a factor. In one aspect, the factor is a factor of 2, (iii) a method further comprising: generating non-periodic patterns by individually offsetting centers of the plurality of lenses of the lens array and (iv) any combinations thereof.

In yet another aspect, the present invention provides a system for generating a plurality of dynamic patterns for measuring an object, the system comprising: at least one processor operable to: electronically control the luminous intensities of each of a plurality of discrete regions of a light source to generate structured light for a collimator; directing the structured light from the light source onto a lens array using the collimator; producing sub-images of the structured light using a plurality of lenses of the lens array wherein the sub-images are formed in a focal plane of the lens array to form the plurality of dynamic patterns; imaging the plurality of dynamic patterns onto a surface of the object to be measured with illumination optics; recording a plurality of reflected images from the surface of the object with an imaging sensor, and processing the plurality of reflected images to obtain a three-dimensional image of the object using a modulation signal of the light source.

Further features and advantages, as well as the structure and operation of various embodiments herein, are described in detail below with reference to the accompanying drawings.

BRIEF DESCRIPTION OF THE DRAWINGS

Example embodiments may become more fully understood from the detailed description given herein below and the accompanying drawings, wherein like elements are represented by like reference characters, which are given by way of illustration only and thus are not limitative of the example embodiments herein and wherein.

Figure 1:
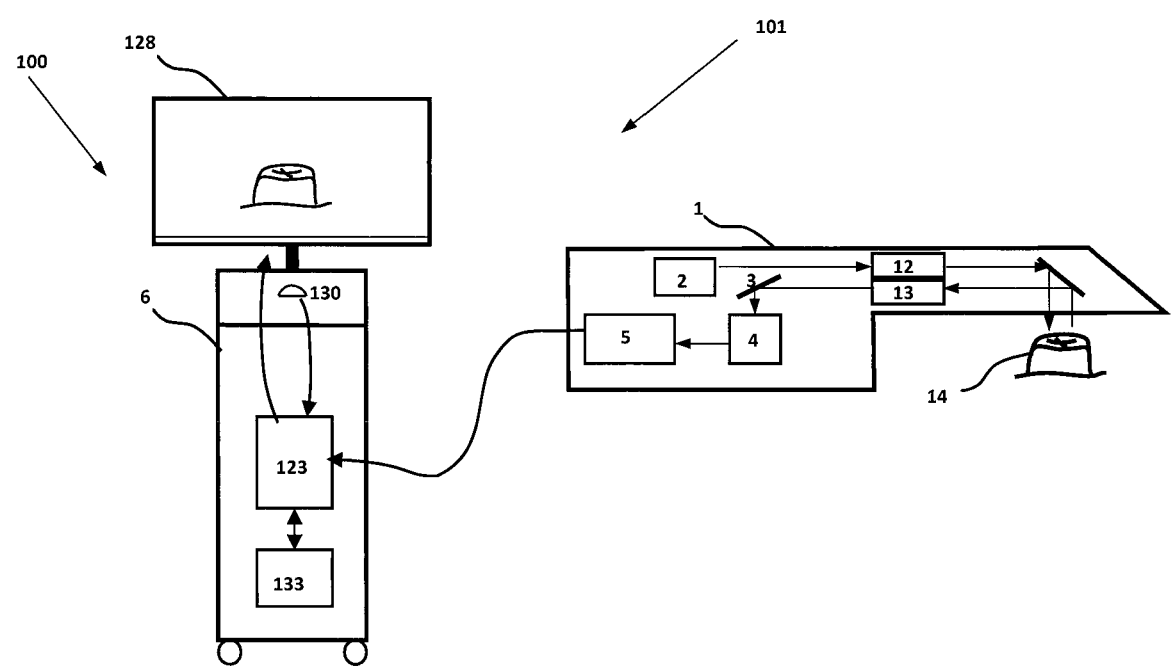
FIG. 1 illustrates a camera system used for projecting patterns to measure an object.

Different ones of the Figures may have at least some reference numerals that are the same in order to identify the same components, although a detailed description of each such component may not be provided below with respect to each Figure.

DETAILED DESCRIPTION OF THE PREFERRED EMBODIMENTS

In accordance with example aspects described herein, a device, method and system are provided for generating dynamic patterns in a camera for example a dental camera for projection onto the surface of an object for three-dimensional (3D) measurement.

In one aspect, an optical array generator 2 for generating projection patterns may be provided in a camera 1, for example a dental camera. The optical array generator may comprise a collimator 21, an LED array 20 and a lens array 22. The collimator 21 may be constructed to direct light of the LED array 20 onto the lens array 22 which comprises sub lenses 25. A computer system 100 may control and synchronize (i) exposure times of image sensors 4 and (ii) the LEDs of the LED array 20 to emit light in a predetermined pattern. For example, some LEDs may be turned on at the same time as other LEDs are turned off to produce a predetermined pattern of structured light. In an embodiment herein, a temporal lighting sequence of the LEDs may be repeated periodically. Each sub lens 25 of the lens array 22 may be constructed to produce an image of the controlled LED array 20. As such an image/structured light produced by the LED array 20 may be multiplied into an array of sub-images 26 by the lens array 22. The sub-images 26 of lens array 22 combine in the focal plane 23 of the lens array 22 to form a combined image 27. Lenses 25 of the lens array 22 may be biconvex to allow for a high light efficiency due to the use of high numerical apertures in the illumination path. In an embodiment herein, a first interface of the biconvex lens may act as a Fourier lens generating an image. The second interface may act as a field lens, directing light to a pupil of an imaging optics of the camera system. In another embodiment, the camera 1 is provided with projection optics to project the combined image 27 onto a surface of the object 14 to be measured. In an embodiment herein, the images produced by the LED array 20 for conversion into sub-images may be structured and variable (non-static). In an embodiment herein, the light source may comprise LED dies 59. In another embodiment, laser diodes or other light emitting elements (not shown) may be used. In yet another embodiment, the light source may be formed from one end of a plurality of optical fibers that have light sources attached to the other end. In yet another embodiment, multiple collimators 21 each having multiple light sources may be used.

According to another example embodiment herein, a camera system 101 is provided. The camera system may include an optical array generator 2 configured to generate projection patterns onto an object 14 to be measured, a sensor 4 for recording reflected projection patterns, and a digital signal processing unit 5 for processing the recorded images. In an embodiment, the sensor 4 may include an in pixel demodulation function wherein the sensor comprises a photodiode, preamplifier synchronous demodulator and an integrator. In another embodiment, the sensor 4 is a 2D-sensor for recording a continuous sequence of images for different projection patterns generated by the optical array generator. In another embodiment, the system 101 comprises an acquisition unit 6 for further processing the recorded images and displaying a three-dimensional measurement of the object 14.

According to another example embodiment herein, a method for utilizing an optical array generator 2 to generate dynamic patterns in a camera for projection onto the surface 15 of an object for three-dimensional (3D) measurement is provided. According to an example embodiment herein, the method comprises generating a plurality of projection patterns from an LED array 20, directing each of the plurality of projection patterns of the LED array 20 onto a lens array 22 using a collimator 21, producing sub images 26 of each plurality of the projection patterns with sub lenses 25 of the lens array wherein the sub images 26 are formed in a focal plane 23 of the lens array 22 to form a combined image 27, focusing the plurality of projection patterns onto a surface 15 of an object 14 to be measured; imaging a plurality of reflected images onto the imaging sensor 4; recording the plurality of reflected images from the surface of the object 15 with a sensor 4 and processing the plurality of recorded images to obtain a three-dimensional image of the object.

In an embodiment, generating a plurality of projection patterns may include reducing the average irradiance of the object to be measured by generating time varying patterns with the LED array for projection, wherein, one or more indicia (e.g., shapes, stripes, dots and/or otherwise) of a projected pattern are omitted. In an embodiment, every $n^{th}$, for example second, bright indicia (e.g., stripe, checkerboard patterns) of the projected pattern may be omitted through the control of the LED array 22 by the computer system 100. In an embodiment in which every second bright indicia (e.g., stripe) of a projected pattern is omitted, the average irradiance of the object 14 may be reduced by a factor of two, which also halves the diffuse background radiation of the object 14 while the signal amplitude of the remaining fringes remains the same or substantially the same. In an embodiment in which every second bright indicia (e.g., stripe) of a projected pattern is omitted, the signal to noise ratio may be improved by a factor of sqrt(2). The omission of stripes decreases the number of available features for 3D reconstruction, therefore alternating patterns shifted by a factor of a period are projected in a temporal sequence such that the same or substantially the same number of 3D data points in total for 3D reconstruction are obtained, as if there had been no omissions. For example, in an embodiment, a first projection pattern and a second projection pattern, may be obtained from a standard projection pattern comprising alternating bright and dark stripes. The first projection pattern may be obtained by omitting every second bright stripe of the standard projection pattern. The second projection pattern may be obtained by shifting the first projection pattern by half a period. By projecting the first projection pattern and the second projection pattern (i.e. the first projection pattern shifted by half a period), in an alternating fashion, the same or substantially the same number of 3D data points may be obtained as if the standard projection pattern had been used for projection, thus reducing the number of bright stripes per projection that are incident on the object being measured and thus the average irradiance of the object 14 to be measured.

In another embodiment, the recording step may be performed with a sensor 4 provided with an in pixel demodulation function wherein the sensor comprises a photodiode, preamplifier, synchronous demodulator and and/or integrator. In another embodiment, the recording step may be performed with a 2D sensor for recording a continuous sequence of images for different projection patterns generated by the optical array generator. In another embodiment, the processing step comprises locating projected features in the recorded images and processing the recorded images into a three-dimensional measurement of the object 14.

In yet another embodiment herein lenses 25 of the lens array 22 may be spherical or cylindrical.

The device method and system may be useful for reducing the noise generated in three dimensional measurements and to increase the density of data gathered when scanning an object. The device method and system are described in more detail hereinafter.

Optical Array Generator, Camera and Camera System

FIG. 1 illustrates a block diagram of a camera system 101 comprising a camera 1 for generating dynamic patterns in a camera, and which may be constructed and operated in accordance with at least one example embodiment herein. The system may also comprises a computer system 100 for generating and displaying three dimensional representations of an object. The computer system 100 may be electrically connected to the camera 1. The camera may include an optical array generator 2 comprising a spatially and temporally modulated light source (for example, LED array 20), a collimator 21, and a lens array 22 comprising sub lenses 25 for generating a combined image 27 of the LED array. The combined image 27 may comprise sub images 26 wherein each sub lens may generate a sub image 26. An imaging optic 12 for illumination may project the combined image onto the object 14 to be measured. In an embodiment herein, the imaging optic 12 projects dynamic patterns comprising varying combined images onto the object 14 during a scanning process or exposure. The object 14 may be for example a tooth, skin, gums, ceramics, amalgam, gold and/or otherwise. The camera further comprises an imaging optic 13 for detection of the images reflected by the object 14 during a scanning process or exposure. The received images are propagated by, for example, a deflecting mirror 3 or a 90° prism to a sensor 4 to be recorded. The sensor may be a standard 2D sensor or a sensor with in-pixel demodulation function wherein each pixel of the sensor may include a photodiode, a preamplifier, a synchronous demodulator and an integrator. The photodiode of each pixel may convert the light from the object 14 into photocurrent. The photocurrent may then amplified and fed into the synchronous demodulator. The demodulator may be synchronized by the modulation signal of the light sources of the optical array generator 2. It may be seen that the modulation frequency may be limited only by the light sources. As such, the frequency used for modulation may be up in the MHz range if suitable LEDs or laser diodes are used. Using a high modulation frequency (such as between 20 kHz-500 kHz or between 1 kHz-100 MHz) may have the advantage, that the pixel integrators may not be saturated, even when very high illumination intensities are being used. The demodulator output may be summed over the exposure time by the integrator. At the end of the exposure, the integrated signal may be proportional to the amplitude of the light modulation. Constant background light is suppressed by the demodulation. For read out, the pixels of the image matrix may be addressed sequentially by a switch matrix and the voltages of the integrators may be digitized and transferred to the digital signal preprocessing unit 5. When the sensor is a standard 2D-sensor, it may record a continuous sequence of images for different illumination patterns generated by the optical array generator 2.

During the exposure/scan the digital signal preprocessing unit 5 may collect the single image frames of the sensor 4 and store the image in the local memory of this unit. The images may either be preprocessed on the processing unit 5 of the camera or transmitted to the acquisition unit 6 for further processing steps. Processing may include steps like image filtering to reduce noise, subtracting images generated with different light source to eliminate background light and edge detection. The acquisition unit 6 may comprise a display 128 and computer processor including a central processing unit (CPU) 123 and a random access memory (RAM) 133.

In an embodiment herein, the preprocessed image data may be further analyzed to extract 3D point clouds representing the surface. A distortion correction applied to the points corrects for the imaging properties of the optics. When the camera is moved while recording, a series of point clouds results showing different sections of the object 14 from different viewpoints. These point clouds are rotated and translated individually by the CPU 123 to give a consistent 3D-model. This 3D-model is finally rendered on the display 128.

Figure 3:
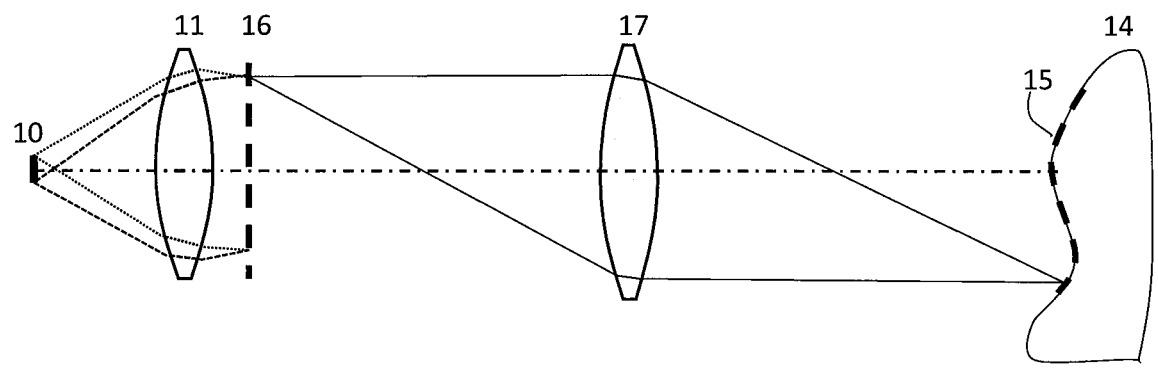
FIG. 3 is a schematic representation of a projector for structured illumination.

FIG. 3 is a basic representation of a projector for fringe projection. Light from a source 10 is directed onto a mask 16 by the collimator 11. Light from the mask 16 is projected onto an object 14 by the imaging optics 17 and thus becomes visible on the surface 15.

Figure 4:
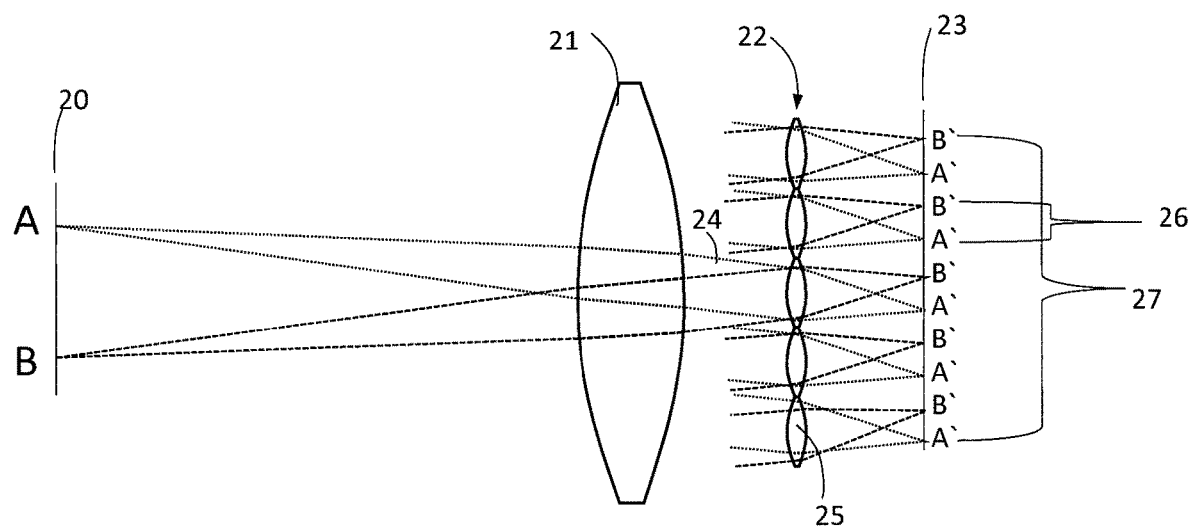
FIG. 4 illustrates an optical array generator according to an embodiment herein.
Figure 4:
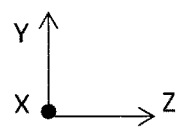
Figure 5:
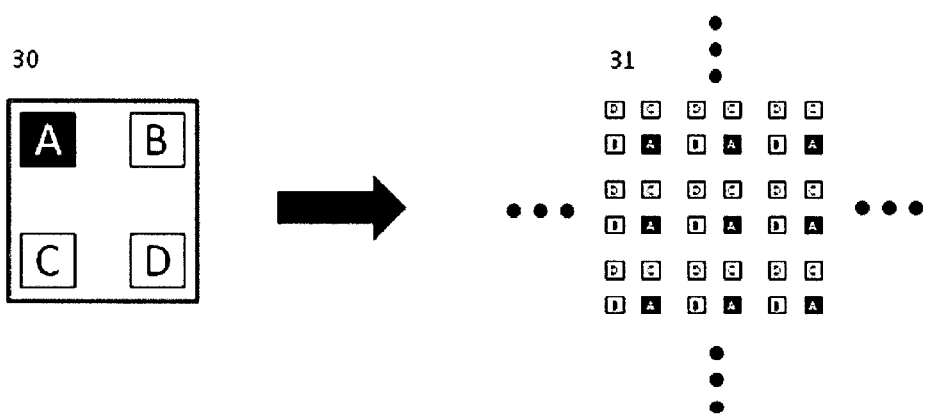
FIG. 5 illustrates the generation of dot patterns with arrays of spherical lenses according to an embodiment herein.

In FIG. 4 provides a schematic representation of the optical array generator 2 for generating time varying dynamic patterns. FIG. 5 provides a top view of the LED array 20 of the optical array generator 2. A collimator 21 directs the light of the LED array 20 onto a lens array 22. Each sub-lens 25 of the lens array will produce a sub-image 26 of the LED array. In an embodiment herein, the LED array is a 2×2 LED array 30 as shown in FIG. 5, however other LED arrays may be used, for example an n×m LED may be used where "n" may be between 1-10 and "m" may be between 2-10, though it may not be restricted to this. The sub-images 26 combine in the focal plane 23 of the lens array 22 to form a combined image 27. The combined image 27 in this plane may then be imaged onto the object surface by means of the imaging optics for illumination 12 (projection optics) of the scanner. In an example embodiment herein, as shown in FIG. 4, two light sources (A, B) of the LED array 20 are placed in the object plane (X-Y plane) of the collimator 21. Behind the collimator 21, the beams originating from the light sources, form two tilted beams 24. The beams may be focused by the lens array 22 into an image plane 23. Each individual lens may generate one focus pair (A', B'). The offset between the focus points A' and B' may be determined by the choice of the incidence angle of the tilted beams 24 and the focal length of the lens array. In an embodiment, multiple collimators 21 and multiple light sources may be used. Herein, a light source is coupled with a collimator 21. Individual collimators may be aligned directly under the required angle of incidence to the lens array 22. However, to save space it may be advantageous to align the collimators in parallel and set the angle of incidence of light to the lens array 22 using deflecting elements e.g. mirrors.

Figure 7:
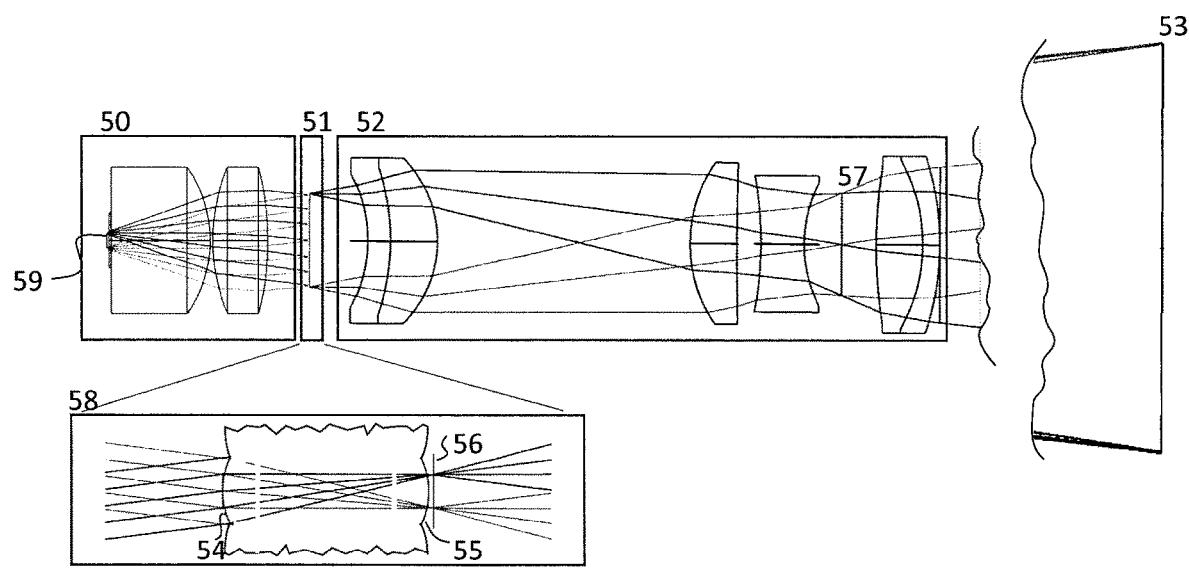
FIG. 7 illustrates an exemplary embodiment discussed herein.

FIG. 7 illustrates another embodiment herein. A collimator assembly 50 may focus the light from, for example, two LED dies 59 onto a cylindrical, biconvex lens array 51 comprising entry and exit lens pairs (54, 55), wherein each pair may create a stripe in the image plane 56 for each LED die 59. In an embodiment herein, the centers of the two LED dies may be spaced 1.5 mm apart (or for example between 0.5 mm-15 mm apart) and the collimator may have an effective focal length of 10 mm. This may result in a tilt angle of a $\tan ((1.5 \text{ mm}/2)/10 \text{ mm})=4.3°$ (or for example between 2°-10° or between 0.1°-30°) for the parallel light bundles exiting the collimator assembly 50. Due to a refractive index of, for example, n=1.52 of the lens array 51, the angle may be reduced to 2.8° in the substrate of the array. From a requirement that the stripes should have a spacing of 100μ, (or for example between 2μ to 200 μm), it thus results in a thickness of the lens array of $(100 \text{ μm}/2)/\tan (2.8)°=1.0$ mm (or for example between 50 μm to 10 mm). The distance between the centers of two adjacent micro lenses (pitch) may be twice the stripe spacing (e.g. 200 μm). Section 58 shows an enlarged, single pair of lenses of the array in cross section. The entrance lenses 54 may act as Fourier lenses and generate foci in the image plane 56. The exit lenses 55 may act as field lenses ensuring that the beam cones behind the foci are perpendicular to the image plane 56. As a result, the light may be imaged on the test object 53 by the lens 52 without vignetting.

Figure 8:
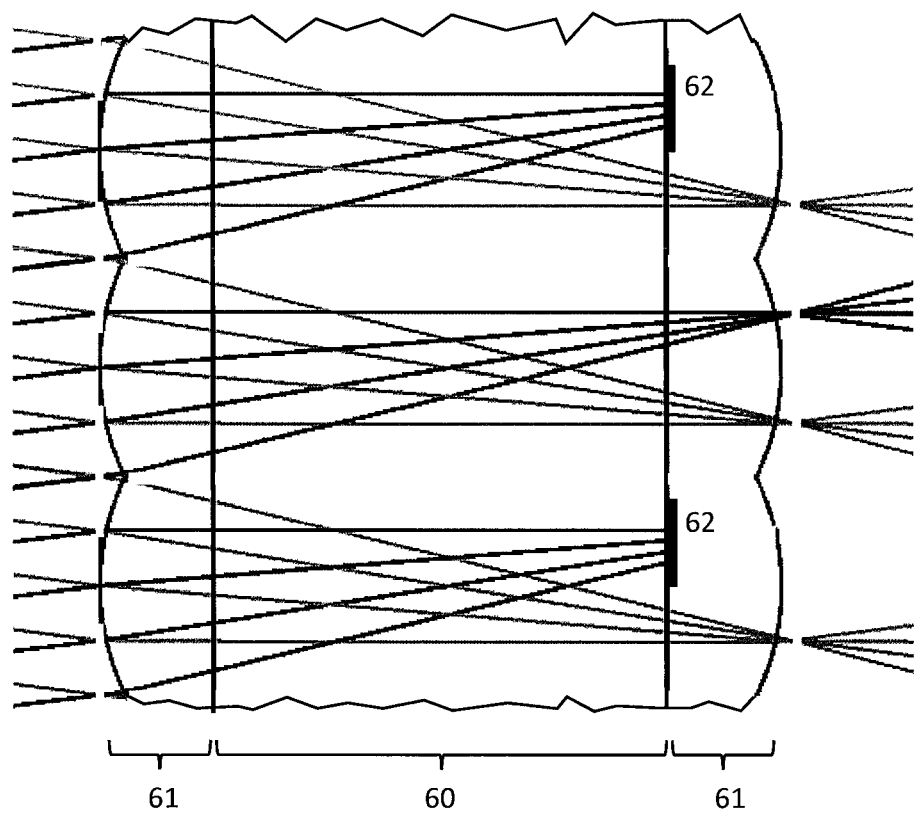
FIG. 8 illustrates a combination of the lens array and an additional mask.

FIG. 8 illustrates yet another embodiment herein. A lens array 22 may comprise a glass carrier 60 with two polymer layers molded thereto and a structured mask 62 applied to the glass carrier 60. Herein, points or lines may be selectively hidden for certain light sources by the use of the mask 62. In another embodiment herein, the mask may be a structured color filter, wherein a binary or a color code may be impressed on a periodic pattern produced by the LED array 20.

Figure 10:
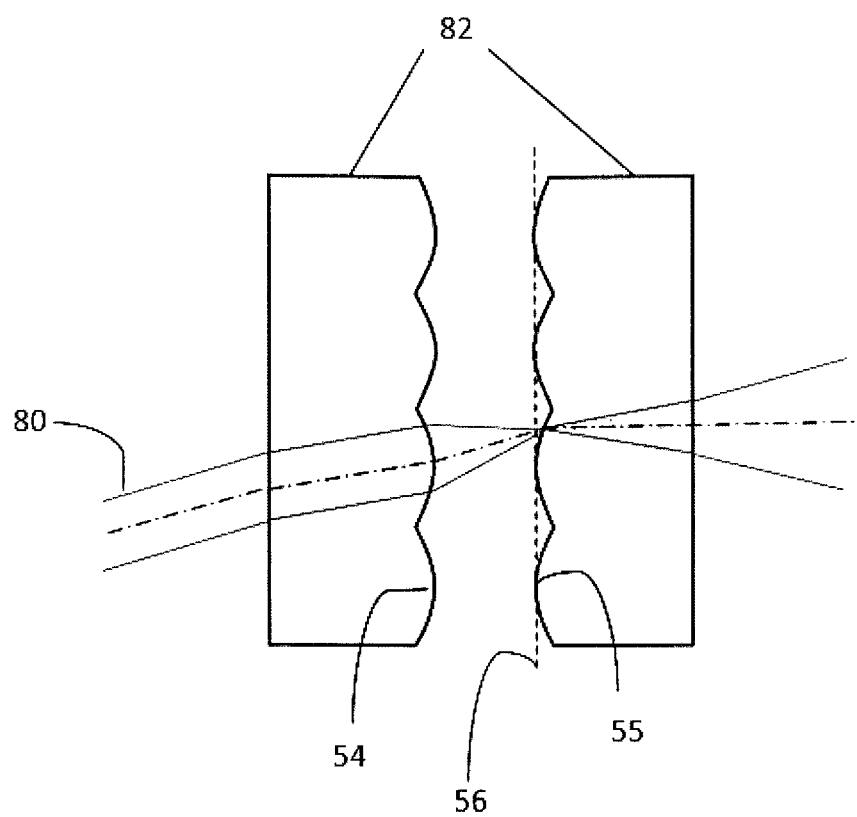
FIG. 10 is a diagram showing two, single sided, aligned, lens arrays, mounted with lenses facing each other.

FIG. 10 illustrates yet another embodiment herein a robust micro-lean array configuration may be realized wherein the configuration may be a "sandwich" configuration and may comprise a plurality of micro-lens arrays 82 (for example two micro-lens arrays) each having a thick, single sided profile and which may be mounted with their lenses 54, 55 aligned and facing each other as shown in FIG. 10. Herein incoming parallel rays 80 may be incident on entrance lenses 54 which may act as Fourier lenses and generate foci in the image plane 56. Exit lenses 55 may act as field lenses ensuring that beam cones behind the foci are perpendicular to the image plane 56.

Computer System for Generating Dynamic Patterns in a Camera for 3D Measurement

Having described a system 101 for generating dynamic patterns in a camera for projection onto the surface of an object for three-dimensional (3D) measurement, reference will now be made to FIG. 2, which shows a block diagram of a computer system 100 that may be employed in accordance with at least some of the example embodiments herein. Although various embodiments are described herein in terms of this exemplary computer system 100, after reading this description, it will become apparent to a person skilled in the relevant art(s) how to implement the disclosure using other computer systems and/or architectures.

In one example embodiment herein, at least some components of the computer system 100 may form or be included in the computer system 100 of FIG. 1. The computer system 100 includes at least one computer processor 122. The computer processor 122 may include, for example, a central processing unit 123 as shown in FIG. 1, a multiple processing unit, an application-specific integrated circuit ("ASIC"), a field programmable gate array ("FPGA"), or the like. The processor 122 may be connected to a communication infrastructure 124 (e.g., a communications bus, a cross-over bar device, or a network). In an embodiment herein, the processor 122 includes a CPU 123 that obtains image data from the preprocessing unit 5 of the camera 1 having a sensor 4 with an in-pixel demodulating function. The image data may be temporarily stored in memory and then analyzed. Upon moving the camera 1 while recording, a series of point clouds are formed. The CPU 123 may rotate and translate the point clouds to give a consistent 3D-model for rendering on the display interface 126 of the computer system 100. In another embodiment, the CPU may match image features detected by the sensor 4 to the projected features and convert them to a 3D-point cloud by triangulation with each image resulting in a separate point cloud. Herein, the sensor may not possess in-pixel demodulating functionality. When the camera is moved a series of point clouds results. These point clouds may be rotated and translated individually by the CPU 123 to give a consistent 3D-model. This 3D-model is finally rendered on the display 128. In an embodiment herein, direct detection of edges or features in the image data may be carried out. In yet another embodiment herein, the digital signal preprocessing unit 5 of the camera 1 may be incorporated into the computer system 100.

The display interface (or other output interface) 126 forwards video graphics, text, and other data from the communication infrastructure 124 (or from a frame buffer (not shown)) for display on a display unit 128 (which, in one example embodiment, may form or be included in the display unit 128 of FIG. 1). For example, the display interface 126 may include a video card with a graphics processing unit.

The computer system 100 also includes an input unit 130 that may be used by a user of the computer system 100 to send information to the computer processor 122. In one example embodiment herein, the input unit 130 may form or be included in the input unit 130 of FIG. 1. The input unit 130 may include a trackball or other input device. In one example, the display unit 128, the input unit 130, and the computer processor 122 may collectively form a user interface.

One or more steps of generating the dynamic patterns may be stored on a non-transitory storage device in the form of computer-readable program instructions. To execute a procedure, the processor 122 loads the appropriate instructions, as stored on storage device, into memory and then executes the loaded instructions.

Figure 2:
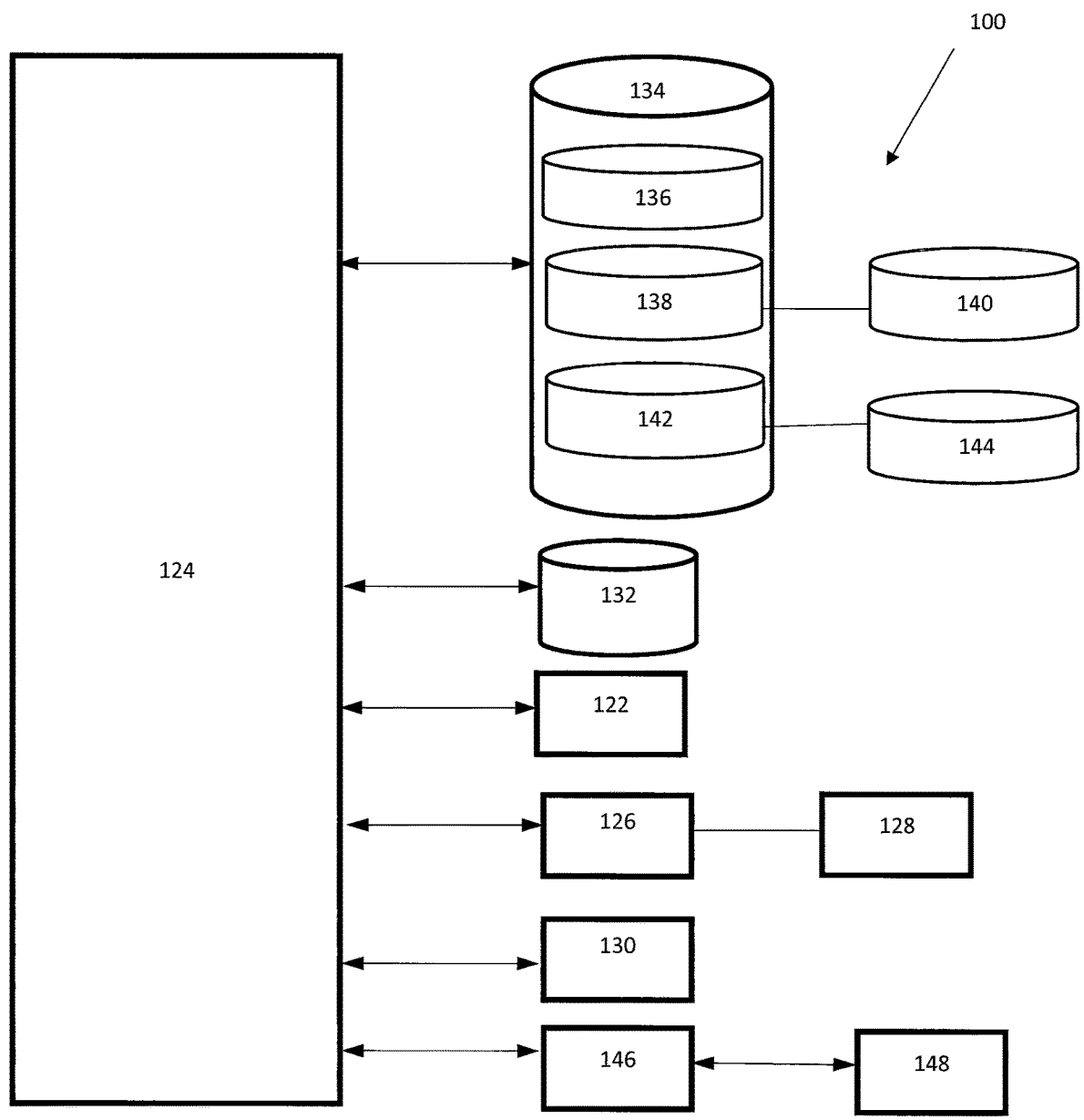
FIG. 2 illustrates a block diagram of an example computer system of the system of FIG. 1.

The computer system 100 of FIG. 2 may comprise a main memory 132, which may be a random access memory ("RAM") 123 as shown in FIG. 1, and also may include a secondary memory 134. The secondary memory 134 may include, for example, a hard disk drive 136 and/or a removable-storage drive 138 (e.g., a floppy disk drive, a magnetic tape drive, an optical disk drive, a flash memory drive, and the like). The removable-storage drive 138 reads from and/or writes to a removable storage unit 140 in a well-known manner. The removable storage unit 140 may be, for example, a floppy disk, a magnetic tape, an optical disk, a flash memory device, and the like, which is written to and read from by the removable-storage drive 138. The removable storage unit 140 may include a non-transitory computer-readable storage medium storing computer-executable software instructions and/or data.

In further alternative embodiments, the secondary memory 134 may include other computer-readable media storing computer-executable programs or other instructions to be loaded into the computer system 100. Such devices may include a removable storage unit 144 and an interface 142 (e.g., a program cartridge and a cartridge interface); a removable memory chip (e.g., an erasable programmable read-only memory ("EPROM") or a programmable read-only memory ("PROM")) and an associated memory socket; and other removable storage units 144 and interfaces 142 that allow software and data to be transferred from the removable storage unit 144 to other parts of the computer system 100.

The computer system 100 also may include a communications interface 146 that enables software and data to be transferred between the computer system 100 and external devices. Such an interface may include a modem, a network interface (e.g., an Ethernet card, Bluetooth, or an IEEE 802.11 wireless LAN interface), a communications port (e.g., a Universal Serial Bus ("USB") port or a FireWire® port), a Personal Computer Memory Card International Association ("PCMCIA") interface, and the like. Software and data transferred via the communications interface 146 may be in the form of signals, which may be electronic, electromagnetic, optical or another type of signal that is capable of being transmitted and/or received by the communications interface 146. Signals are provided to the communications interface 146 via a communications path 148 (e.g., a channel). The communications path 148 carries signals and may be implemented using wire or cable, fiber optics, a telephone line, a cellular link, a radio-frequency ("RF") link, or the like. The communications interface 146 may be used to transfer software or data or other information between the computer system 100 and a remote server or cloud-based storage (not shown).

One or more computer programs or computer control logic may be stored in the main memory 132 and/or the secondary memory 134. The computer programs may also be received via the communications interface 146. The computer programs include computer-executable instructions which, when executed by the computer processor 122, cause the computer system 100 to perform the methods as described hereinafter. Accordingly, the computer programs may control the computer system 100 and other components of the camera system 101.

In another embodiment, the software may be stored in a non-transitory computer-readable storage medium and loaded into the main memory 132 and/or the secondary memory 134 of the computer system 100 using the removable-storage drive 138, the hard disk drive 136, and/or the communications interface 146. Control logic (software), when executed by the processor 122, causes the computer system 100, and more generally the camera system in some embodiments, to perform the some of the methods described hereinafter.

Lastly, in another example embodiment hardware components such as ASICs, FPGAs, and the like, may be used to carry out the functionality described herein. Implementation of such a hardware arrangement so as to perform the functions described herein will be apparent to persons skilled in the relevant art(s) in view of this description.

Method for Generating Dynamic Patterns in a Camera for 3D Measurement.

Figure 6:
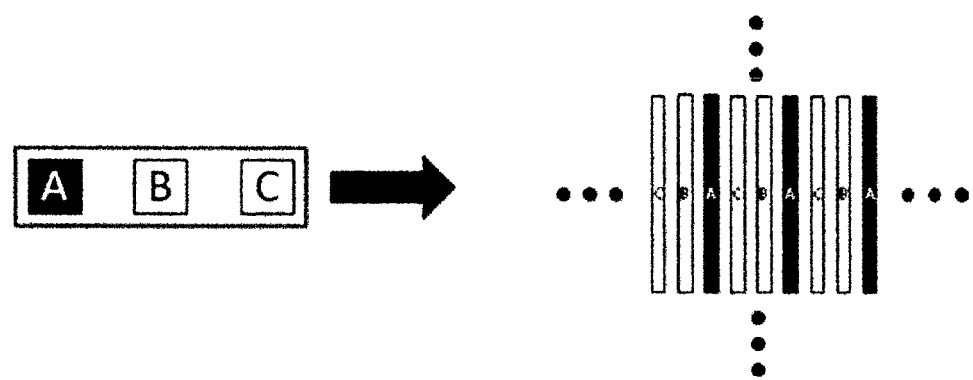
FIG. 6 illustrates the generation of stripe patterns with a cylindrical lens array according to an embodiment herein.

Having described the computer system 100 of FIG. 2, the camera system 101 will now be further described in conjunction with FIG. 4-6 which show methods of generating projection patterns using different lens types.

According to an example embodiment herein, time varying patterns may be generated for projection by omitting some stripes of a projected pattern, for example, every second bright stripe of the projected pattern. This may reduce the average irradiance of the object by a factor of two, which also halves the diffuse background radiation of the object. The signal amplitude of the remaining fringes however remains the same. This will therefore improve the signal to noise ratio by a factor of sqrt(2). This is because pixel-noise is dominated by the shot noise on modern image sensors. Shot noise arises because pixels may be regarded as counters for randomly arriving photons. For a constant light intensity, the statistics of counted photons may be approximated by a normal distribution, having a standard deviation of sqrt(n), where n is the average number of counted photons. Thus the signal to noise ratio (S/N) is S/N=n/sqrt(n)=sqrt(n). The read out of a single pixel may give a signal proportional to the sum of the counted background light photons nb and the desired signal photons ns. Because in translucent materials the background light might dominate the signal (nb>>ns), the signal to noise ratio may be determined by the intensity of the background light S/N= sqrt(n)~sqrt(nb). Thus in an example embodiment herein where the diffuse scattered background light nb is halved by omitting every second bright stripe, and wherein the signal ns is kept constant because the intensity of the remaining stripes is kept unchanged, the signal to noise ratio is improved by a factor of sqrt(2).

Figure 9:
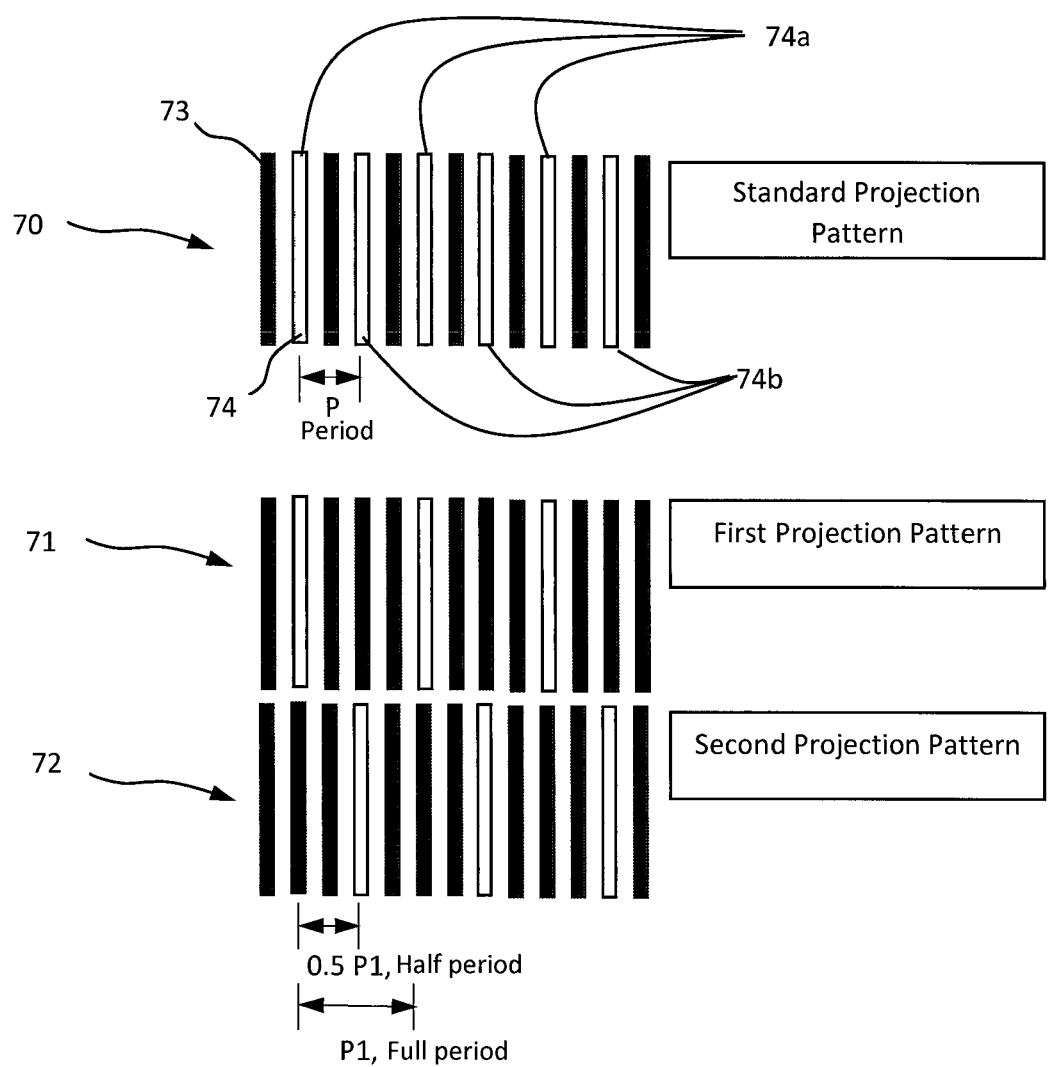
FIG. 9 is a diagram illustrating a relationship between two projection patterns of an embodiment herein.

In an example embodiment herein, the reduction of the bright stripes incident on the object 14 being measured, reduces the number of available features for the 3D-reconstruction. Projecting and evaluating several different patterns in a temporal sequence to receive the same number of 3D data points in total, as if there had been no omissions allows for 3D reconstruction with the same spatial resolution. For example, as shown in FIG. 9, a first projection pattern 71 and a second projection pattern 72, may be obtained from a standard projection pattern 70 comprising alternating bright stripes 74 and dark stripes 73. The first projection pattern 71 may be obtained by omitting every second bright stripe 74*b* of the standard projection pattern 70. The second projection pattern 72 may be obtained by shifting the first projection pattern 71 by half a period (0.5*P1). By projecting the first projection pattern 71 and the second projection pattern 72 (i.e. the first projection pattern 71 shifted by half a period), in an alternating fashion, the same number of 3D data points may be obtained as if the standard projection pattern 70 had been projected, thus reducing the number of bright stripes 74 per projection that are incident on the object being measured and thus reducing the average irradiance of the object to be measured while obtaining the same number of data points for reconstruction. By superposing the first projection pattern 71 and the second projection pattern 71 the standard projection pattern 70 may be obtained. In an example embodiment herein, the dark stripes 73 may correspond to an LED of the LED array 20 that is turned off and the bright stripes 74 may correspond to an LED of the LED array 20 that is turned on. It may be seen by a person of ordinary skill in the art (POSA) that the technique may be adapted for varying projection patterns. For example, every second and third bright strip of another standard projection pattern (not shown) may be omitted to obtain another first projection pattern (not shown) wherein the another first projection pattern is shifted by one-third of a period to obtain another second projection pattern (not shown) and the another second projection pattern is shifted by one-third of a period to obtain a third projection pattern (not shown), and wherein superposition of the another first, another second and third projection patterns will produce the another standard projection pattern.

To obtain the projection patterns, the intensity of each LED/die in the LED array may be controlled individually.

Turning now to FIG. 5, wherein only one LED (A) of the four LEDs (A, B, C, D) is activated, a dot pattern 31 may be generated in the image plane of the lens array with the pattern having only a quarter (¼) of the features to be transmitted in an exposure and a quarter (¼) of the mean light intensity. Accordingly, a lower amount of scattered light results compared to the amount of scattered light that would result when all 4 LEDs are turned on at the same time. It may be seen that the four LED-dies (A, B, C, D), are imaged by the setup to an array of downsized images. When only one LED is turned on, a thinned dot pattern is created. If another LED is turned on, and the first LED turned off, a shifted thinned dot pattern is created. The full information in the LED array 30 to be transmitted to object 14 is therefore obtained by turning the 4 LEDs on successively and recording corresponding reflected images for each LED that is turned on.

It may be seen that whereas arrays of spherical lenses may be used to generate dot patterns as shown in FIG. 5, a linear array of cylindrical lenses may be used to generate fringe-patterns as shown in FIG. 6. Single sided lenses may also be used. Herein, the light sources (LEDs) may be arranged in a row perpendicular to the image plane 23. Each lens may generate a stripe-shaped image of each light source as shown in FIG. 6. By sequentially activating the respective light sources, laterally shifted fringe patterns may be generated for projection and recording.

In a further embodiment according to the invention, stereoscopic imaging and reconstruction may be used. Stereoscopic object reconstruction reconstructs a 3D object by deducing the spatial shape and position of the object through parallax between corresponding pixels from different images of the object as observed from multiple viewpoints. The principle of stereo vision techniques is triangulation, in which the unique contours of the object may be determined with the photos taken from two unparalleled cameras. Stereo vision approaches may rely on the correspondence between photo elements from two cameras which sometimes may be difficult to determine. In order to avoid ambiguity in stereoscopic object reconstruction projection patterns that are non-periodic may be used. These non-periodic patterns may also be generated by the methods described above if the centers of the lenses in a lens array 22 are individually offset. The offset of the lenses from the nominal grid positions may be random, and may not exceed half the lens diameter. Likewise, aperiodic tiling may serve as a basis for the lens arrangement.

Another way to avoid the periodicity of the pattern of a regular lens array may be to place a patterned mask 62 near the focal plane of the lens array. Herein individual stripes or spots generated by the combination of certain lenses and light sources may be suppressed. For example, in stereo imaging, one light source may be used to create a complete stripe or dot pattern for a high density of 3D-points and another source may be used to generate a thinned, random dot pattern to provide additional information for unambiguous matching of stereo images, as shown in FIG. 8. A structured color filter may also be used in the focal plane of the lens array 22 to add an additional color code on a periodic pattern generated by the lens array 22, said code being individually changeable for each light source.

A time sequential projection may require multiple image acquisitions for a full-density 3D reconstruction. With moving objects or moving cameras/scanners, this may lead to unwanted artifacts in the object reconstruction. It may therefore be desirable to acquire the complete 3D-infomation at one time. An alternative to the time sequential acquisition is the spectral coding of the individual image frames. For this purpose a plurality of narrowband light sources with small spectral overlap may be used. If all light sources are active at the same time, multiple colored patterns may be superposed simultaneously on the object. A color camera (not shown) with corresponding spectral channels may then be able to record the individual images simultaneously. In the simplest case, a standard RGB color sensors may be used for this purpose. If more than three colors are used, a hyperspectral sensor may be used.

In yet another embodiment, complementary patterns ay be generated. If the patterns have the same fill factor, diffuse background noise may be eliminated by subtracting the two complementary object images (for example, two patterns wherein a bright region in one pattern corresponds to a dark region in the other), since the diffuse background is identical in both images. Examples of complementary patterns may include checkerboard patterns, stripe patterns, or dot patterns each offset by half a period or otherwise.

Advantages of the embodiments described herein include robustness, as there are no moving parts. Moreover since the optical setup may not include slides or grid structures, light from the collimator 21 passes through the lens array 22 to the imaging optics for illumination 12 with little to no absorption. Moreover, in comparison with other devices such as cameras that use digital micro mirror devices (DMDs) or liquid crystal devices (LCDs), space may be saved due to compact size.

In view of the foregoing description, it may be appreciated that the example embodiments described herein provide a device, method and system for generating dynamic projection patterns in a camera.

Unless otherwise defined, all technical and scientific terms used herein have the same meaning as commonly understood by one of ordinary skill in the art to which this invention belongs. Although methods and materials similar to or equivalent to those described herein may be used in the practice or testing of the disclosure, suitable methods and materials are described above. All publications, patent applications, patents, and other references mentioned herein are incorporated by reference in their entirety to the extent allowed by applicable law and regulations. The disclosure may be embodied in other specific forms without departing from the spirit or essential attributes thereof, and it is therefore desired that the present embodiment be considered in all respects as illustrative and not restrictive. Any headings utilized within the description are for convenience only and have no legal or limiting effect.

What is claimed is:

1. A camera, comprising:
an optical array generator for generating a plurality of dynamic patterns for projection;
an imaging optics arranged within the camera to focus the plurality of dynamic patterns from the optical array generator onto a surface of an object to be measured, and
an imaging sensor arranged within the camera to record a plurality of reflected images formed from reflection of the plurality of dynamic patterns by the surface of the object to be measured,
wherein the optical array generator further includes (i) a light source including a plurality of discrete regions wherein a luminous intensity of each of the plurality of discrete regions is controlled independently, (ii) a lens array comprising a plurality of lenses and, (iii) a collimator constructed to direct light of the light source to the plurality of lenses such that each lens of the plurality of lenses that is illuminated by light from the light source, images said light of the light source onto an image plane of the lens array in order to produce the plurality of dynamic patterns and,
wherein luminous intensities of the plurality of regions of the light source are electronically controlled to generate the plurality of dynamic patterns in a time varying manner
wherein the light source is configured to project, in a temporal sequence, the dynamic patterns as a plurality of component projection patterns that are superposable to form a standard projection pattern, each of the plurality of component projection patterns comprising the standard projection pattern having one or more omitted and/or shifted indicia, in order to reduce an average irradiance of the object, and
wherein the camera is further configured to obtain reflected component projection patterns such that a same or substantially the same number of 3D data points are received in total as the number of 3D data points that would be received when projecting the standard projection pattern.

2. The camera of claim 1, wherein each of the plurality of lenses is biconvex.

3. The camera of claim 1, wherein the plurality of discrete regions of the light source are selected from the group consisting of LED dies, laser diodes and an end of a plurality of optical fibers that have other light sources attached to the other end.

4. The camera of claim 1, further comprising multiple collimators and multiple light sources.

5. The camera of claim 1, further comprising a digital signal processing unit for processing the recorded images.

6. The camera of claim 1, wherein the imaging sensor is constructed to perform in-pixel demodulation.

7. The camera of claim 1, wherein the light source is a 2×2 LED array of LED dies.

8. The camera of claim 1, wherein the wherein each of the plurality of lenses is spherical.

9. The camera of claim 1, wherein the wherein each of the plurality of lenses is cylindrical.

10. The camera of claim 1, wherein the thickness of the lens array is between 50 µm to 10 mm.

11. The camera of claim 1,
wherein the lens array includes a glass carrier, two polymer layers molded on opposite sides of the glass carrier and a structured mask applied to the glass carrier for selectively altering light of the light source.

12. The camera of claim 11, wherein the structured mask is a structured color filter for impressing a binary or a color code on the light from the light source.

13. The camera of claim 1, wherein the plurality of dynamic patterns are non-periodic.

14. The camera of claim 1, wherein the centers of the plurality of lenses of the lens array are individually offset, to produce the non-periodic dynamic patterns.

15. The camera of claim 1, wherein the plurality of dynamic patterns are periodic.

16. The camera of claim 1, wherein the lens array includes entrance and exit lens pairs, wherein the entrance lenses act as Fourier lenses and the exit lenses act as field lenses and wherein each pair creates a sub-image in the image plane.

17. The camera of claim 1, wherein the lens array includes a first lens array having entrance lenses which act as Fourier lenses and a second lens array having exit lenses which act as field lenses and wherein the first and second micro-lens arrays have a single sided profile and are constructed to face each other.

18. A method for generating a plurality of dynamic patterns for measuring an object, the method comprising the steps of:
electronically controlling the luminous intensities of each of a plurality of discrete regions of a light source to generate structured light for a collimator;
directing the structured light from the light source to a plurality of lenses of a lens array,
using the collimator, such that each lens of the plurality of lenses that is illuminated by light from the light source, images said light from the light source onto an image plane of the lens array in order to produce the plurality of dynamic patterns;
focusing the plurality of dynamic patterns onto a surface of an object to be measured;
imaging a plurality of reflected images onto the imaging sensor;
recording the plurality of reflected images with the imaging sensor, and
processing the plurality of recorded reflected images to obtain a three-dimensional image of the object using a modulation signal of the light source
wherein the method further comprises reducing an average irradiance of the object by projecting the plurality of dynamic patterns, in a temporal sequence, as a plurality of component projection patterns that are superposable to form a standard projection pattern, each of the plurality of component projection patterns being the standard projection pattern with one or more omitted and/or shifted indicia, and obtaining and evaluating reflected component projection patterns such that a same or substantially the same number of 3D data points are received in total as the number of 3D data points that would be received when projecting the standard projection pattern.

19. The method according to claim 18, wherein the average irradiance of the object is reduced by a factor.

20. The method according to claim 18, wherein the factor is a factor of 2.

21. The method according to claim 18, further comprising the step of:
generating non-periodic patterns by individually offsetting centers of the plurality of lenses of the lens array.

22. A system for generating a plurality of dynamic patterns for measuring an object, the system comprising:
at least one processor operable to:
electronically control the luminous intensities of each of a plurality of discrete regions of a light source to generate structured light for a collimator;
direct the structured light from the light source to a plurality of lenses of a lens array, using the collimator, such that each lens of the plurality of lenses that is illuminated by light from the light source, images said light from the light source onto an image plane of the lens array in order to produce the plurality of dynamic patterns;
image the plurality of dynamic patterns onto a surface of the object to be measured with illumination optics;
record a plurality of reflected images from the surface of the object with an imaging sensor, and
process the plurality of reflected images to obtain a three-dimensional image of the object using a modulation signal of the light source
wherein the at least one processor is further operable to reduce an average irradiance of the object by projecting the plurality of dynamic patterns, in a temporal sequence, as a plurality of component projection patterns that are superposable to form a standard projection pattern, each of the plurality of component projection patterns being the standard projection pattern with one or more omitted and/or shifted indicia, and obtain and evaluate reflected component projection patterns such that a same or substantially the same number of 3D data points are received in total as the number of 3D data points that would be received when projecting the standard projection pattern.

\* \* \* \* \*